United States Patent [19]
Christoph et al.

[11] 3,893,975
[45] July 8, 1975

[54] HIGH MOLECULAR WEIGHT LINEAR POLYAMIDES FROM ARALIPHATIC DIAMINES

[75] Inventors: Geert Christoph; Eduard Radlmann; Günther Nischk, all of Dormagen, Germany

[73] Assignee: Bayer Aktiengesellschaft, Leverkusen, Bayerwerk, Germany

[22] Filed: Mar. 11, 1974

[21] Appl. No.: 450,209

Related U.S. Application Data

[63] Continuation of Ser. No. 269,840, July 7, 1972, abandoned.

[30] Foreign Application Priority Data

July 9, 1971 Germany.......................... 2134172

[52] U.S. Cl..... 260/47 CZ; 260/30.2; 260/30.8 DS; 260/32.6 N; 260/33.4 R; 260/33.4 P; 260/78 R; 260/78 A

[51] Int. Cl............................................ C08g 20/20
[58] Field of Search............ 260/47 CZ, 78 R, 78 A

[56] References Cited
UNITED STATES PATENTS

| | | | |
|---|---|---|---|
| 2,130,948 | 9/1938 | Carothers | 18/54 |
| 2,625,536 | 1/1953 | Kirby | 260/78 |

*Primary Examiner*—Lester L. Lee
*Attorney, Agent, or Firm*—Plumley & Tyner

[57] ABSTRACT

This invention relates to high molecular weight linear polyamides and co-polyamides which are obtained by melt-condensation of an araliphatic diamine containing one aromatic and one aliphatic amino group in its molecule, with an aliphatic dicarboxylic acid, optionally in admixture with a salt of an aliphatic dicarboxylic acid and an aliphatic diamine and/or of a lactam, and to foils and fibres produced from these polyamides and co-polyamides.

5 Claims, No Drawings

HIGH MOLECULAR WEIGHT LINEAR POLYAMIDES FROM ARALIPHATIC DIAMINES

This is a continuation of application Ser. No. 269,840, filed July 7, 1972, now abandoned.

This invention relates to high molecular weight linear polyamides and co-polyamides which are obtained by melt-condensation of an araliphatic diamine containing one aromatic and one aliphatic amino group in its molecule, with an aliphatic dicarboxylic acid, optionally in admixture with a salt of an aliphatic dicarboxylic acid and an aliphatic diamine and/or of a lactam, and to filaments and fibres produced from these polyamides and co-polyamides.

A number of polamides having aromatic amide groups are known, which are obtained by melt-condensation or interfacial condensation of binary systems of aliphatic diamines/aromatic dicarboxylic acids or aromatic diamines/aliphatic dicarboxylic acids. If the ternary system aliphatic diamine/aromatic diamine/aliphatic dicarboxylic acid is used for condensation, copolyamides containing aliphatic and aromatic amide groups in pure statistical distribution are obtained.

Other polyamides and processes for their production are also known, which are obtained by polycondensation of "araliphatic" diamines with, for example, cycloaliphatic and heterocyclic dicarboxylic acids (S. F. Smirnova-Zamkova in Ukrainskij chimiceskij zurnal 30, 208-219, 1964). In this reference, however, araliphatic diamines are always understood to be diamines of the kind which, although containing an aromatic ring in the molecule, always contain the amino group attached to it through an alkylene radical.

It has now been found that, where aliphatic diamines of the kind which contain an amino group directly attached to the aromatic ring and the second amino group attached to the aromatic ring through an alkylene group, are used with aliphatic dicarboxylic acids, it is possible to obtain novel polyamides or, by the addition of other polyamide formers, for example, AH-salt or ε-caprolactam, novel copolyamides by polycondensation which give high-viscosity, substantially colourless melts with good film-forming and filament-forming properties.

One particularly important property of these co-polyamides is their solubility in highly polar solvents such as dimethyl formamide, dimethyl acetamide, dimethyl sulphoxide and N-methyl pyrrolidone. Furthermore, those co-polyamides which are produced with caprolactam and which contain more than 10% by weight of araliphatic diamines, are soluble to an extent of up to 50% by weight in methanol or methanol-water mixtures. In this case, they show outstanding film-forming properties.

Accordingly, the invention relates to novel, high molecular weight, linear polyamides consisting essentially of a. 100 to 1 mol % of recurring structural elements corresponding to the general formula

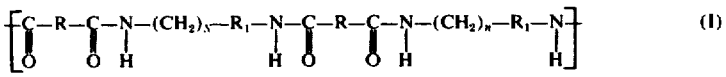 (I)

and

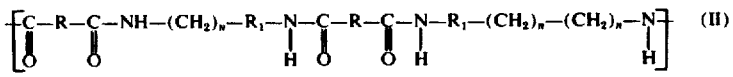 (II)

wherein:

R represents a linear or branched alkylene radical with 4 to 10 carbon atoms;

$R_1$ represents a substituted or unsubstituted radical selected from the group consisting of 1,3-phenylene, 1,4-phenylene, 1,4-naphthylene, 1,5-naphthylene, 4,4'-diphenylene, 4,4'-diphenylene substituted one or more times by halogen or lower alkyl groups and a radical substituted one or more times by halogen or lower alkyl groups or unsubstituted of the general formula

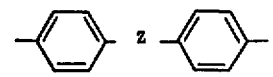

wherein:

Z is a number selected from the group consisting of —O—, —S—, —$CH_2$—, —$(CH_2)_2$— and

$n$ is an integer from 1 to 4; and b. 0 to 99 mol % of recurring structural elements corresponding to the general formula selected from the group consisting of

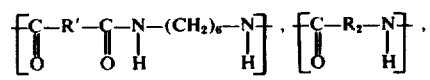

and mixtures thereof wherein:

R' represents a linear or branched alkylene radical with 4 to 10 carbon atoms; and $R_2$ represents a linear or branched alkylene radical with 3 to 20 carbon atoms;

said polyamide having a relative solution viscosity in the range from 1.1 to 4.0 as measured on a solution of 1 g of polyamide in 100 ml of m-cresol at 25°C.

A preferred embodiment of this invention is a high molecular weight polyamide consisting essentially of a. 100 to 1 mol % of recurring structural elements corresponding to the general formula

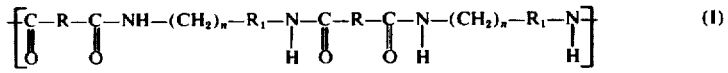 (I)

and

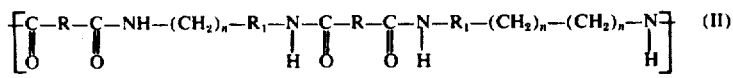 (II)

wherein:

R represents a radical selected from the group consisting of —(CH$_2$)$_4$—, —(CH$_2$)$_6$—, —(CH$_2$)$_7$—, —(CH$_2$)$_8$— and —(CH$_2$)$_{10}$—;

R$_1$ represents a substituted or unsubstituted radical selected from the group consisting of 1,3-phenylene, 1,4-phenylene, and 4,4'-diphenylene ether, wherein the substituent is one or more chlorine atoms;

n is an integer from 1 to 4; and b. 0 to 99 mol % of recurring structural elements corresponding to the general formula selected from the group consisting of

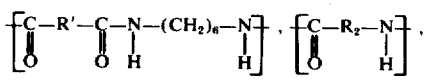

and mixtures thereof
wherein:

R' represents a radical selected from the group consisting of 1,3-phenylene, 1,4-phenylene, and 4,4'-diphenylene ether, wherein the substituent is one or more chlorine atoms; and R$_2$ is a radical selected from the group consisting of

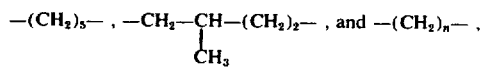

said polyamide having a relative solution viscosity in the range from 1.1 to 4.0 as measured on a solution of 1 g of polyamide in 100 ml of m-cresol at 25°C.

A further object of this invention is a process for the production of high molecular weight linear polyamides having relative solution viscosities in the range from 1.1 to 4.0 as measured on a solution of 1 g of polyamide in 100 ml of m-cresol at 25°C, which comprises polycondensing in the melt in the absence of oxygen in an inert gas atmosphere at temperatures of from 100° to 300°C and at pressures between normal pressure and 0.001 Torr wherein a. from 100 to 1 mol % of a stoichiometric mixture of a dicarboxylic acid corresponding to the general formula

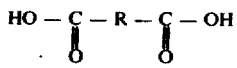

in which:

R represents a linear or branched alkylene radical with 4 to 10 carbon atoms, and an araliphatic diamine corresponding to the general formula

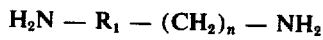

in which:

R$_1$ represents a radical selected from the group consisting of a 1,3-phenylene radical, a 1,4-phenylene radical, a 1,4-naphthalene radical, a 1,5-naphthylene radical and a radical corresponding to the general formula

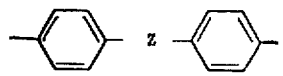

(in which Z is a single bond or represents a radical selected from the group consisting of —O—, —S—, —CH$_2$—, —(CH$_2$)$_2$— and

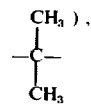

whose aromatic rings are unsubstituted or substituted either once or several times by halogen or lower alkyl groups;

n is an integer from 1 to 4; with b. from 0 to 99 mol % a polyamide forming compound selected from the group consisting of a stoichiometric mixture of a dicarboxylic acid corresponding to the general formula

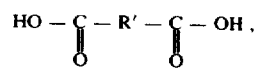

and hexamethylene diamine,
a salt corresponding to the general formula

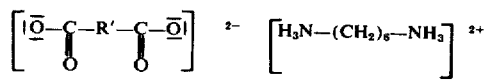

a lactam corresponding to the general formula

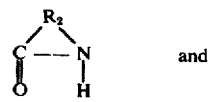 and mixtures thereof,
wherein:

R' represents a linear or branched alkylene radical with 4 to 10 carbon atoms; and R$_2$ represents a linear or branched alkylene radical with 3 to 20 carbon atoms.

The resulting polyamides and copolyamides having aromatic and aliphatic amide groups are eminently suitable for being formed from the melt into shaped structures, particularly into filaments and foils.

The araliphatic diamines having one aromatic and one aliphatic amino group in the molecule which are used in the preparation of the novel polyamides and copolyamides are generally known compounds which can be obtained in high yields by various known processes, for example:

1. By reacting m- or p-nitrocarboxylic acid chlorides with ammonia to form the corresponding nitrocarboxylic acid amide, subsequently eliminating the water present (for example using thionyl chloride) to yield the nitrocarboxylic acid nitrile, followed by hydrogenation to produce the araliphatic diamine;
2. by nitrating carboxylic acid nitriles, followed by hydrogenation of the nitro and nitrile group; and
3. exchanging halogen for the nitrile group in nitrohalogen, alkyl aromatic compounds, followed by hydrogenation to produce the araliphatic diamine.

Examples of suitable diamines include the compounds 3-amino benzyl amine, 4-amino benzyl amine, β-(3-amino phenyl)-ethyl amine, β-(4-amino phenyl)-ethyl amine, γ-(3-amino phenyl)-propyl amine, γ-(4-amino phenyl)-propyl amine, 4-amino-4'-amino methyl diphenyl and 4-amino-4'-aminomethyl diphenyl ether.

Suitable aliphatic dicarboxylic acids include those having from 6 to 12 carbon atoms, but especially adipic acid, suberic acid, azelaic acid, sebacic acid and decano 1,10-dicarboxylic acid.

ε-caprolactam, γ-methyl-ε-caprolactam and lauric lactam are mentioned by way of example as particularly suitable lactams corresponding to the general formula:

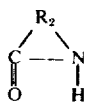

suitable for co-condensation.

In one preferred embodiment of the process according to the invention, polycondensation is carried out by heating a mixture of the starting components with stirring to a temperature of from 100° to 300° C. over a period of from 30 minutes to 18 hours under normal pressure in the presence of an inert gas, for example, nitrogen or hydrogen. The starting components are preferably used in equivalent quantities. On completion of the pre-condensation stage, the pressure is reduced, generally to below 15 Torr and preferably to below 1 Torr. Polycondensation is carried out under these conditions for periods of from 15 minutes to 12 hours until the required melt viscosity is obtained. On completion of polycondensation, the polyamide or copolyamide formed can be directly processed from the melt into shaped articles such as filaments, foils or other shaped articles.

The novel polyamides and co-polyamides are distinguished by their outstanding natural colour, by favourable mechanical and thermal properties and by their outstanding ability to be processed. Compared with conventional polyamides and copolyamides which contain aromatic amide groups in the molecule, the new polyamides and co-polyamides have the advantage that the condensation times are shortened when araliphatic diamines as opposed to pure aromatic diamines are used.

As a result, the relatively heavy discolouration of the polycondensate attributable to prolonged condensation times is reduced and also advantages afforded by the introduction of aromatic rings into a polyamide molecule are simultaneously obtained. It is particularly emphasised that the polycondensates obtained in accordance with the invention have a low tendency towards crystallisation and, for this reason, are transparent and have a high gloss.

The relative solution viscosities $\eta_{rel}$ quoted in the following Examples were measured at 25° C. on solutions of 1 g of substance in 100 ml solution in m-cresol. The following Examples are to further illustrate the invention without limiting it.

EXAMPLE 1

A mixture of 36.5 parts by weight of adipic acid and 30.5 parts by weight of carefully distilled 3-amino benzyl amine is introduced into a metal bath heated to 160° C. while a stream of oxygen-free nitrogen is passed over in a condensation apparatus consisting of a 250 ml three-necked flask with a metal stirrer, a gas-inlet pipe and a distillation bridge. The mixture is then condensed for 15 minutes at 160° C., for 15 minutes at 180° C., for 30 minutes at 220°C., for 30 minutes at 250° C. and for 60 minutes at 275° C. at normal pressure, and for 30 minutes at 275°C./15 Torr and for another 465 minutes at 275°C./1 Torr. A highly viscous melt is obtained which has little or no discolouration and has excellent filament-forming properties. The filaments obtained have a softening point of 140° to 144° C. $\eta_{rel}$ 2.27.

EXAMPLE 2

Following the procedure of Example 1, a mixture of 52.4 parts by weight of hexamethylene diammonium adipate (AH-salt), 6.1 parts by weight of 3-amino benzyl amine and 7.3 parts by weight of adipic acid, is condensed under nitrogen for 15 minutes at 160°C., for 20 minutes at 180°C., for 15 minutes at 220° C., for 15 minutes at 250° C. and for 45 minutes at 270° C. under normal pressure. Thereafter, vacuum is applied, followed by condensation for 30 minutes at 270°–275°C./13 Torr and for 240 minutes at 270°C./0.07 Torr. A highly viscous melt which is slightly yellow in colour is obtained from which high strength filaments with favourable cold- and hot-stretching properties can be drawn. Softening point 240° C., $\eta_{rel}$ 2.24.

EXAMPLE 3

As described in Example 1, 52.4 parts by weight of AH-salt, 7.3 parts by weight of adipic acid and 7.83 parts by weight of 6-chloro-3-amino benzyl amine are condensed under nitrogen for 15 minutes at 160° C., for 20 minutes at 180° C., for 15 minutes at 220° C., for 25 minutes at 250° C. and for 45 minutes at 270° C. under normal pressure and for 30 minutes at 270°C./9–12 Torr and for another 235 minutes at 270°C./0.05–0.03 Torr. A melt with excellent filament-forming properties is obtained. The filaments obtained show outstanding cold- and hot-stretching properties coupled with high strength. Softening point 242°–250° C. $\eta_{rel}$ 2.04.

EXAMPLE 4

Following the procedure of Example 1, 41.3 parts by weight of hexamethylene diammonium sebacate (SH-salt), 15.9 parts by weight of 3-amino benzyl amine and 26.3 parts by weight of sebacic acid are heated to 180° C under nitrogen and the mixture is then condensed for 30 minutes at 180° to 185° C, for 30 minutes at 220° C, for 15 minutes at 250° C and for 85 minutes at 275° C under normal pressure. Following the application of vacuum, condensation is continued for 30 minutes at 275° C./20 Torr and for 240 minutes at 275° C./3 Torr. A highly viscous melt is obtained from which filaments with a good natural colour, high strength and favourable stretching properties, can be drawn. Softening point 167° C, $\eta_{rel}$ 2.24.

EXAMPLE 5

Under the same reaction conditions as described in Example 1, 52.4 parts by weight of AH-salt, 3.4 parts by weight of β-(4-amino phenyl)-ethyl amine and 3.65 parts by weight of adipic acid are condensed under a nitrogen atmosphere for 15 minutes at 220° C., for 10 minutes at 250° C., for 25 minutes at 275° C. and for 65 minutes at 300° C. under normal pressure and for 30 minutes at 300°C./18 Torr and for 230 minutes at 300°C./1.5–1.3 Torr. After this time, an extremely high-viscosity melt is formed. The resulting filaments show favourable stretching properties, a good natural colour and outstanding strength. Softening point above 260° C., $\eta_{rel}$ 2.82.

EXAMPLE 6

55.7 Parts by weight of SH-salt, 4.87 parts by weight of β-(4-amino phenyl)-ethyl amine and 7.07 parts by weight of sebacic acid are condensed under a nitrogen atmosphere as in Example 1 for 15 minutes at 155°–160° C., for 25 minutes at 180° C., for 15 minutes at 220° C., for 20 minutes at 250° C. and for 90 minutes at 275° C. under normal pressure and, following the application of vacuum, for 25 minutes at 300°C./10 Torr. An extremely high-viscosity melt with good filament forming properties is obtained. The filaments show favourable cold- and hot-stretching properties, coupled with high strengths and a softening point of 230°–235° C. $\eta_{rel}$ 2.96.

EXAMPLE 7

As in Example 1, 51.9 parts by weight of the hexamethylene diamine salt of decano-1,10-dicarboxylic acid, 4.08 parts by weight of β-(4-amino phenyl)-ethyl amine and 6.9 parts by weight of decano-1,10-dicarboxylic acid are condensed under a nitrogen atmosphere for 15 minutes at 160° C., for 15 minutes at 180° C., for 15 minutes at 220°C., for 15 minutes at 250° C. and for 60 minutes at 275° C. under normal pressure and then for 20 minutes at 300°C./13 Torr and for 65 minutes at 300° C./0.1 Torr, to form an extremely high-viscosity melt from which transparent, high strength filaments with favourable cold- and hot-stretching properties can be drawn. Softening point 234°–236° C., $\eta_{rel}$ 3.12.

EXAMPLE 8

45.3 Parts by weight of ε-caprolactam, 14.6 parts by weight of adipic acid and 13.6 parts by weight of β-(4-amino phenyl)-ethyl amine are condensed for 30 minutes at 160° C., for 30 minutes at 180° C., for 30 minutes at 220° C. and for 750 minutes at 250° C. under normal pressure in the apparatus described in Example 1. A high-viscosity melt with little or no discolouration is obtained from which stable filaments having good cold- and hot-stretching properties can be drawn. Softening point 206°–212° C., $\eta_{rel}$ 2.30.

EXAMPLE 9

Under the conditions described in Example 1, 34.0 parts by weight of ε-caprolactam, 20.4 parts by weight of β-(4-amino phenyl)-ethyl amine and 21.9 parts by weight of adipic acid are condensed for 30 minutes at 160° C., for 30 minutes at 180° C., for 30 minutes at 220° C., for 345 minutes at 250° C. and for 255 minutes at 275° C., to form a highly viscous melt with good filament-forming properties. The filaments obtained can readily be stretched and have a softening point of 250°–256° C. $\eta_{rel}$ 2.27.

EXAMPLE 10

52.4 Parts by weight of AH-salt, 4.28 parts by weight of 4-amino-4'-amino methyl diphenyl ether and 2.92 parts by weight of adipic acid are heated under a nitrogen atmosphere as in Example 1 in a melt bath to 220° C. and condensed for 15 minutes at 220° C, for 15 minutes at 250° C and for 60 minutes at 275° C under normal pressure. Following the application of vacuum, condensation is continued for 30 minutes at 270° to 275° C/12 Torr, for 150 minutes at 275° C/0.05 Torr and for 70 minutes at 300° C/0.5 to 0.7 Torr, so that a highly viscous melt is obtained from which almost colourless, readily stretchable and highly stable filaments can be drawn. Softening point 238°–246° C., $\eta_{rel}$ 2.26.

EXAMPLE 11

In the apparatus described in Example 1, 52.4 parts by weight of AH-salt, 8.56 parts by weight of 4-amino-4'-amino methyl diphenyl ether and 5.84 parts by weight of adipic acid are condensed under a nitrogen atmosphere for 15 minutes at 220°–225° C., for 15 minutes at 250° C. and for 50 minutes at 275° C. under normal pressure, and for 30 minutes at 275°C./11–15 Torr, for 115 minutes at 275°C./0.5–0.7 Torr and for 60 minutes at 300°C./0.7 Torr. An extremely high-viscosity melt is obtained from which filaments with little discolouration can be drawn. Softening point 234°–240° C., $\eta_{rel}$ 2.45.

We claim:

1. A high molecular weight linear copolyamide consisting essentially of:

a. recurring structural elements corresponding to the general formula

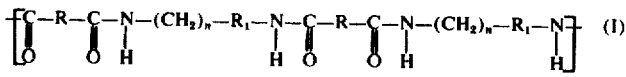

and

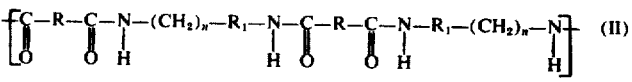

where:

R represents a linear or branched alkylene radical with 4 to 10 carbon atoms;

$R_1$ represents an unsubstituted radical selected from the group consisting of 1,3-phenylene, 1,4-phenylene, 1,4-naphthylene, 1,5-naphthylene, 4,4'-diphenylene, and

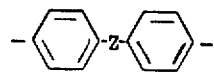

$R_1$ represents substituted radicals selected from the group consisting of 4,4'-diphenylene substituted one or more times by halogen or lower alkyl groups and a radical substituted one or more times by halogen or lower alkyl groups of the general formula

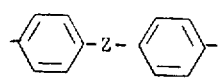

wherein in the above formulae

Z is a member selected from the group consisting of —O—, —S—, —CH$_2$—, —(CH$_2$)$_2$—, and 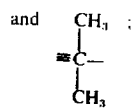

$n$ is an integer from 1 to 4; and b. less than 90% by weight recurring structural elements corresponding to a general formula selected from the group consisting of

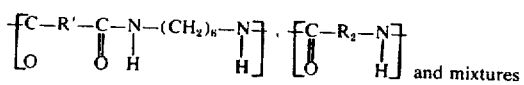 and mixtures thereof wherein:

R' represents a linear or branched alkylene radical with 4 to 10 carbon atoms; and R$_2$ represents a linear or branched alkylene radical with 3 to 20 carbon atoms; said polyamide having a relative solution viscosity in the range from 1.1 to 4.0 as measured on a solution of 1 g of polyamide in 100 ml of n-cresol at 25°C.

2. A high molecular weight linear copolyamide of claim 1 wherein in (a)

R represents a radical selected from the group consisting of —(CH$_2$)$_4$—, —(CH$_2$)$_6$—, —(CH$_2$)$_7$—, —(CH$_2$)$_8$—, and —(CH$_2$)$_{10}$—;

R$_1$ represents an unsubstituted radical selected from the group consisting of 1,3-phenylene, 1,4-phenylene, 4,4'-diphenylene ether or R$_1$ represents a substituted 4,4'-diphenylene ether radical wherein the substitutent is one or more chlorine atoms;

$n$ is an integer from 1 to 4; and in (b)

R$_2$ is a radical selected from the group consisting of —(CH$_2$)$_5$—,

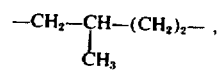

and —(CH$_2$)$_{11}$.

3. The high molecular weight copolyamide as claimed in claim 2, wherein

R$_2$ represents —(CH$_2$)$_5$—.

4. The high molecular weight copolyamide as claimed in claim 3, said copolyamide as an essential part of the polymer chain and in copolymerized form at least 10% by weight of the residue of an araliphatic diamine of the general formula

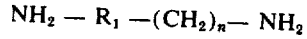

in which:

R$_1$ represents an unsubstituted radical selected from the group consisting of 1,3-phenylene, 1,4-phenylene and 4,4'-diphenylene ether or R$_1$ represents a substitituted 4,4'-diphenylene ether radical wherein the substitutent is one or more chlorine atoms;

$n$ is an integer from 1 to 4.

5. A shaped structure selected from the group consisting of fibers and foils, and comprising the high molecular weight linear copolyamide of claim 1.

* * * * *